(12) United States Patent
Yilbas et al.

(10) Patent No.: US 8,546,724 B2
(45) Date of Patent: Oct. 1, 2013

(54) APPARATUS AND METHOD FOR CONTROLLING LASER CUTTING THROUGH SURFACE PLASMA MONITORING

(75) Inventors: Bekir S. Yilbas, Dhahran (SA); Muhammad A. Hawwa, Dhahran (SA); Shahzada Z. Shuja, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 771 days.

(21) Appl. No.: 12/656,333

(22) Filed: Jan. 26, 2010

(65) Prior Publication Data

US 2011/0180520 A1    Jul. 28, 2011

(51) Int. Cl.
*B23K 26/00*    (2006.01)
(52) U.S. Cl.
USPC .................................. 219/121.72; 219/121.67
(58) Field of Classification Search
USPC ..................................................... 219/121.72
See application file for complete search history.

(56) References Cited

U.S. PATENT DOCUMENTS

| | | | |
|---|---|---|---|
| 5,247,155 A * | 9/1993 | Steen et al. ............... | 219/121.83 |
| 5,517,420 A | 5/1996 | Kinsman et al. | |
| 5,653,896 A | 8/1997 | Couch, Jr. et al. | |
| 5,659,479 A | 8/1997 | Duley et al. | |
| 6,311,099 B1 | 10/2001 | Jasper et al. | |
| 6,674,044 B2 | 1/2004 | Bolognese et al. | |
| 6,900,408 B2 | 5/2005 | Picard et al. | |
| 6,947,802 B2 | 9/2005 | Picard et al. | |
| 7,043,330 B2 | 5/2006 | Toyserkani et al. | |
| 7,186,947 B2 | 3/2007 | Connally et al. | |
| 7,423,236 B2 | 9/2008 | Suh | |
| 2005/0127049 A1 | 6/2005 | Woeste et al. | |
| 2005/0178749 A1* | 8/2005 | Yamazaki et al. ........ | 219/121.62 |

FOREIGN PATENT DOCUMENTS

| | | |
|---|---|---|
| DE | 4138691 A1 | 5/1993 |
| RU | 2176681 C2 | 12/2001 |

OTHER PUBLICATIONS

Edward P. Szuszczewicz and Julian C. Holmes, Surface contamination of active electrodes in plasmas: Distortion of conventional Langmuir probe measurements, 1975, Journal of Applied Physics, 46, 5134-5139.*

* cited by examiner

*Primary Examiner* — Jarrett Stark
*Assistant Examiner* — Lawrence Tynes, Jr.
(74) *Attorney, Agent, or Firm* — Richard C. Litman

(57) ABSTRACT

The apparatus and method for controlling laser cutting through surface plasma monitoring provides real-time monitoring and control of laser cutting quality. Laser cutting of a workpiece is controlled through monitoring of surface plasma generation, particularly during a laser gas-assisted cutting process. The apparatus includes a Langmuir probe positioned adjacent the impingement point of the laser beam on the workpiece. The Langmuir probe is in communication with a signal analyzer for measuring electrical voltage generated by plasma generated by the cutting of the workpiece. A controller is provided for comparing the measured electrical voltage with a desired threshold voltage. Control signals are generated to selectively adjust output power of the laser responsive to the compared measured electrical voltage and the desired threshold voltage to minimize plasma generation.

6 Claims, 4 Drawing Sheets

APPARATUS AND METHOD FOR CONTROLLING LASER CUTTING THROUGH SURFACE PLASMA MONITORING

BACKGROUND OF THE INVENTION

1. Field of the Invention

The present invention relates to laser cutting, and particularly to an apparatus and method for controlling laser cutting through surface plasma monitoring during laser gas-assisted cutting.

2. Description of the Related Art

Laser cutting is a technology that uses a laser to cut materials, and is typically used for industrial manufacturing applications. Laser cutting is performed by directing the output of a high power laser, by computer, at the material to be cut. The material then either melts, burns, vaporizes away, or is blown away by a jet of gas, leaving an edge with a high quality surface finish. Industrial laser cutters are used to cut flat-sheet material as well as structural and piping materials.

In laser cutting, the cutting speed, feed rate, beam geometry, beam intensity, beam focusing, beam/workpiece material, type of workpiece material, and positioning accuracy all affect the tolerances and surface finish of a process. Additionally, during gas-assisted laser cutting, the assisting gas, such as oxygen mixed with argon, produces a plume of surface plasma at the heated surface of the workpiece. The surface plasma production is an unwanted effect, in that the plasma serves to cut the workpiece in unwanted, and generally uncontrollable, ways, thus enhancing sideways burning and thermal erosion around the cut edges of the workpiece. This lowers the quality of the end product.

Thus, an apparatus and method for controlling laser cutting through surface plasma monitoring solving the aforementioned problems is desired.

SUMMARY OF THE INVENTION

The apparatus and method for controlling laser cutting through surface plasma monitoring provides real-time monitoring and control of laser cutting quality. Laser cutting of a workpiece, such as a thick metallic sheet, is controlled through the monitoring of surface plasma generation, particularly during a laser gas-assisted cutting process.

Laser cutting includes a laser for selectively generating a laser beam, along with one or more lenses for focusing the laser beam onto a surface of a workpiece in order to cut the workpiece at an impingement point. The apparatus for controlling the cutting includes a Langmuir probe, which is selectively positioned adjacent the impingement point. The Langmuir probe is in communication with a signal analyzer for measuring electrical voltage generated in the Langmuir probe by plasma generated during the cutting of the workpiece with the laser beam.

A controller is provided for comparing the measured electrical voltage with a desired threshold voltage. Control signals are generated to selectively adjust output power of the laser responsive to the compared measured electrical voltage and the desired threshold voltage so that plasma generation is minimized. Additionally, control signals may also be generated to move the workpiece in order to minimize plasma plume generation during cutting.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The apparatus and method for controlling laser cutting through surface plasma monitoring provides real-time monitoring and control of laser cutting quality. Laser cutting of a workpiece, such as a thick metallic sheet, is controlled through the monitoring of surface plasma generation, particularly during a laser gas-assisted cutting process.

Figure 1:
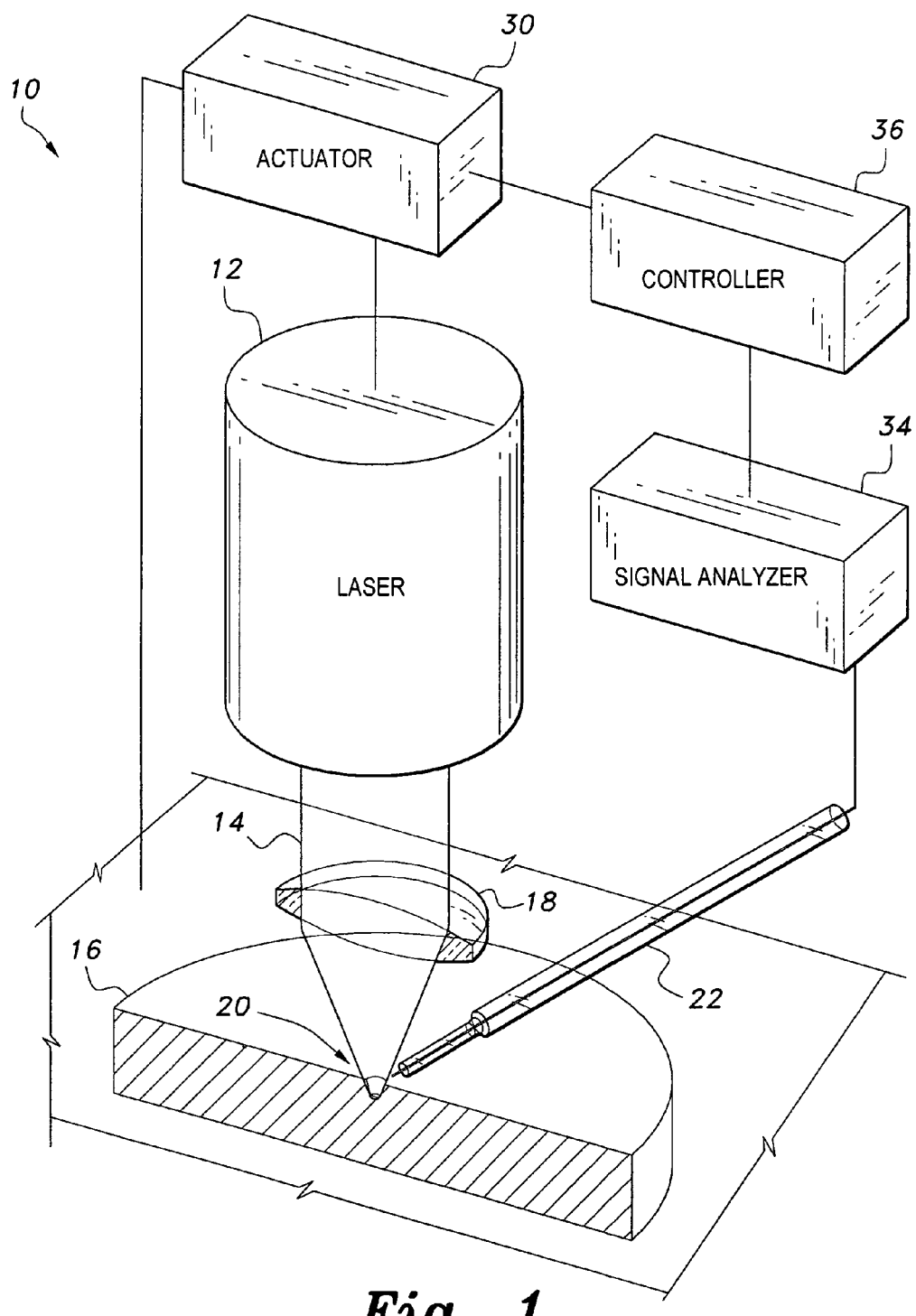
FIG. 1 is a diagrammatic overview of an apparatus for controlling laser cutting through surface plasma monitoring according to the present invention.

FIG. 1 diagrammatically illustrates the system for controlling laser cutting 10. As is conventionally known, any suitable type of cutting laser 12 projects a laser beam 14 onto a workpiece 16. Typically, the laser beam 14 is focused through one or more convex lenses, such as exemplary focusing lens 18, to form a focused, impingement point 20.

During laser cutting of thick metallic sheets and the like, an assisting gas is typically used to enhance the energy available in cutting the workpiece 16. The oxidation reactions produced are exothermic, thus providing additional thermal energy, contributing to the total energy required for cutting of workpiece 16 during the cutting process. A typical assisting gas used for such a reaction is a mixture of oxygen and argon, although any suitable type of assisting gas may be utilized.

The assisting gas, such as oxygen mixed with argon, produces a plume of surface plasma at the heated surface of the workpiece 16 (at sufficient high temperatures). The surface plasma production is generally an unwanted effect, in that the plasma itself also serves to cut the workpiece, enhancing sideways burning and thermal erosion around the cut edges of the workpiece, thus lowering the quality of the end product.

Thus, overall laser cutting quality is strongly associated with the degree of surface plasma formation during the laser cutting process. Greater surface plasma generation leads to an increased likelihood of unwanted effects, such as rippled, rough or contoured surfaces around the cut edges. The apparatus 10 utilizes a Langmuir probe 22 or the like positioned adjacent the impingement point 20, to provide real-time monitoring of generated surface plasma in order to generate feedback and control signals for the laser.

Figure 2:
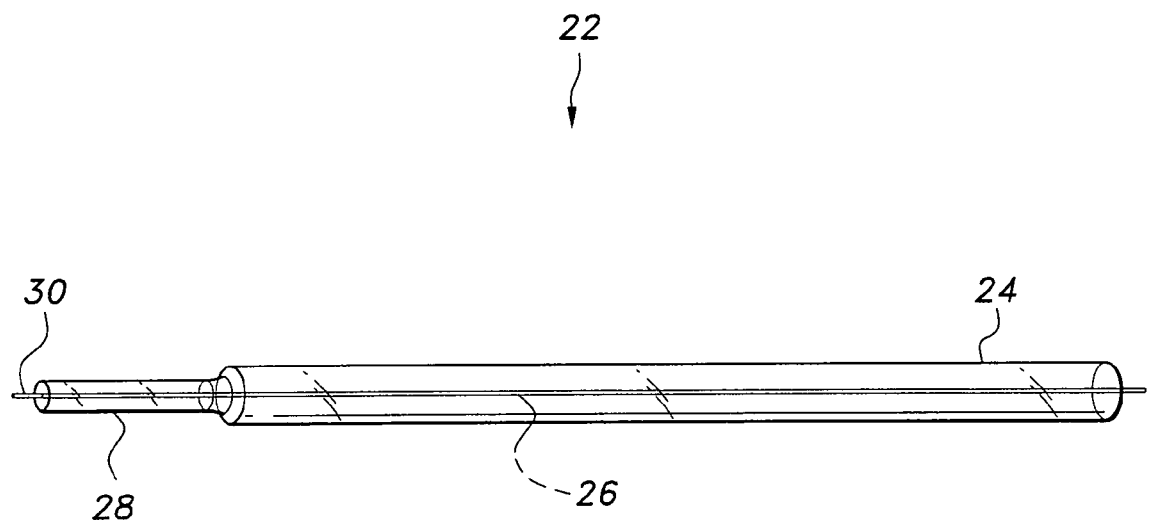
FIG. 2 is a diagrammatic view of a typical prior art Langmuir probe used in the apparatus for controlling laser cutting through surface plasma monitoring of FIG. 1.

Although any suitable sensor for monitoring surface plasma may be used, a Langmuir probe 22 is used in the preferred embodiment, since surface plasma generation is associated with relatively high temperatures, thus making surface plasma monitoring difficult through the use of simple optical systems, due to interfering thermal radiation being generated during cutting. FIG. 2 illustrates a typical Langmuir probe, which includes a hollow housing 24, typically formed from glass or the like, with a conductive wire disposed therein. The wire 26 may be formed from one millimeter diameter tungsten or the like. The probe wire 26 projects outwardly through the open front end 28 of the housing 24, forming a probe tip 30. The tip 30 may be sealed by glue or the like to mount it securely within the open front end 28 of the housing 24.

As is well-known in the art, Langmuir probes are commonly used to determine the electron temperature, electron density, and electric potential of a plasma. In use, one or more electrodes are inserted into the plasma (in FIG. 2, the exemplary Langmuir probe 22 has a single wire 26 forming a single electrode tip 30, although it should be understood that any suitable type of probe may be used), with a constant or time-varying electric potential being generated between the electrodes, or between the electrode(s) and the surrounding housing 24. The measured currents and potentials in this system allow the determination of the physical properties of the plasma.

The Langmuir probe 22 is particularly used to monitor electron temperature and electron density in the plasma plume generated during laser cutting. Laser cut quality improves at relatively high electron temperatures and relatively low electron densities. The Langmuir probe 22 is in communication with an analyzer 34, which, based on input from the probe 22, generates data signals for controller 36, with the data representing the plasma plume dynamics, including the effects of the plume structure, electron density, electron temperature and ion saturation currents. Such analyzers in combination with Langmuir probes are well-known in the art. Examples of such systems or devices are shown in U.S. Pat. Nos. 4,006,404; 5,885,402; and 6,602,384, each of which is herein incorporated by reference.

The Langmuir probe tip 30 contacts the surface of the workpiece 16, as is well known, so that a positive charge is applied to the probe tip 30 during plasma generation (typically having a potential of approximately 6 V DC). Electrons in the surface of the workpiece 16 are attracted to the probe tip's active area due to the positive charge, thus generating a measurable electric current, which may be monitored through an oscilloscope or the like, or may be analyzed by an analyzer 34 and converted into measurement data.

Figure 4:
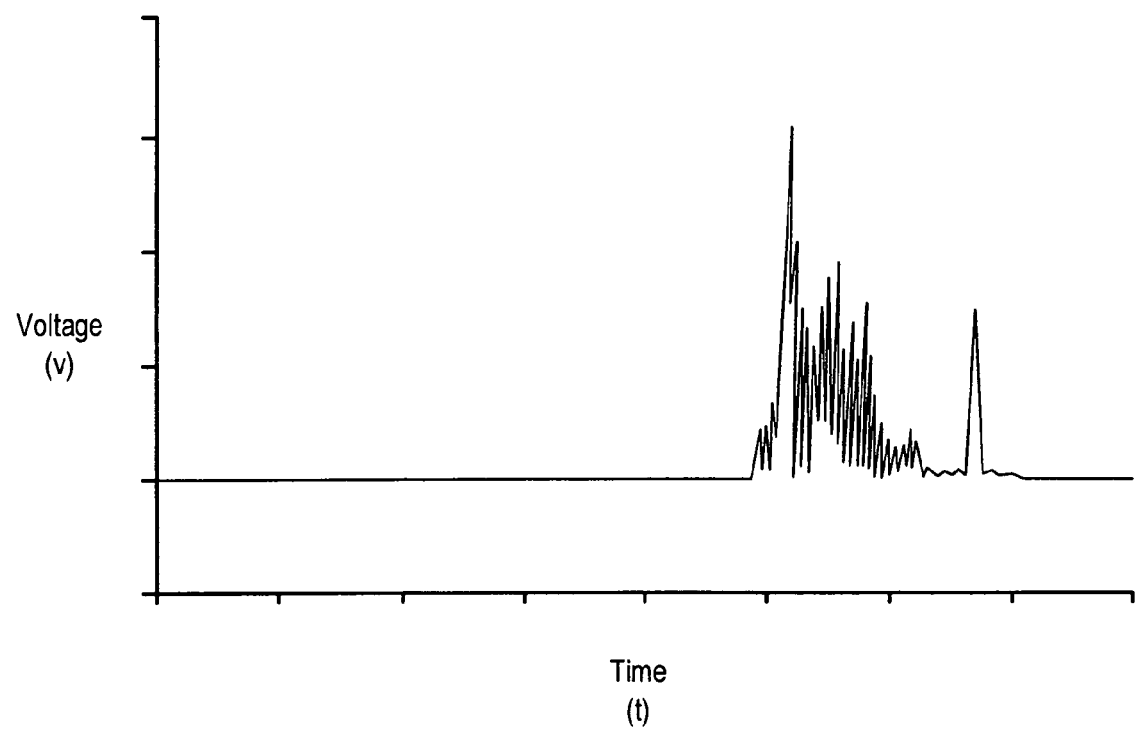
FIG. 4 is a graph illustrating exemplary voltage vs. time measured by the Langmuir probe of FIG. 2.

FIG. 4 illustrates an exemplary representation of measured voltage vs. time, which may be displayed to the user on an oscilloscope, or on any suitable display, such as display 118, associated with the controller 36. The measured voltage data is delivered by the analyzer 34 to the controller 36.

Figure 3:
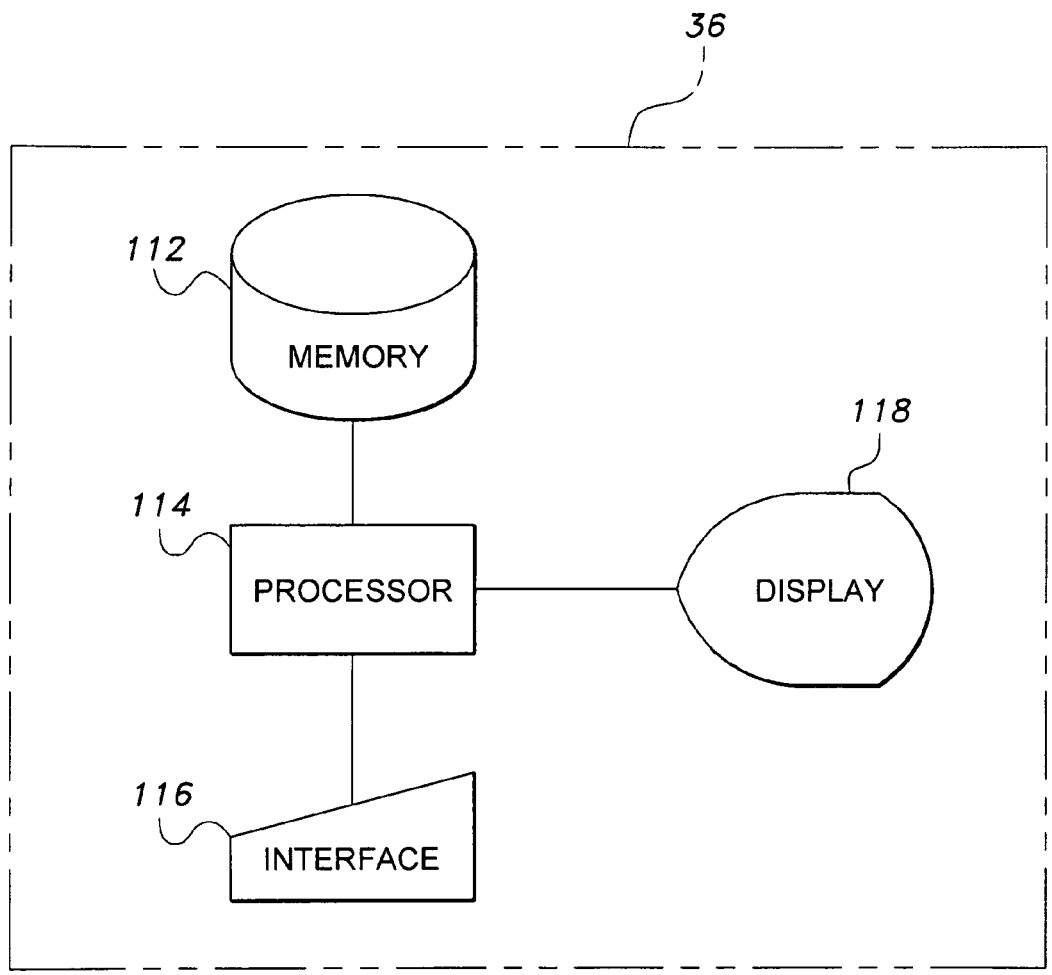
FIG. 3 is a block diagram of a controller of the apparatus for controlling laser cutting through surface plasma monitoring according to the present invention.

It should be understood that the calculations may be performed by any suitable computer system or controller, such as that diagrammatically shown in the FIG. 3. Data is entered into the controller 36 by any suitable type of user interface 116, and may be stored in memory 112, which may be any suitable type of computer readable and programmable memory. Calculations are performed by a processor 114, which may be any suitable type of computer processor, microprocessor, microcontroller, digital signal processor, or the like, and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Preferably, processor 114 calculates the area under the voltage-time curve shown in FIG. 3 (through any suitable numeric integration technique), and compares this area with a desired threshold area, representing a minimal plasma condition. This desired threshold area is input by the user through interface 116 and stored within memory 112 for comparison with the measured area by processor 114. The processor 114 calculates an error difference between the measured area and the desired threshold area.

The controller 36 is in communication with an actuator 30. Actuator 30 controls power output of laser 12, and also includes a mechanical actuator, such as a conventional X-Y table or the like, for moving the workpiece 16 in relation to the laser 12, as is well-known. The processor 114 calculates the error difference between the measured area under the curve and the desired threshold area and, responsive to the error, delivers a control signal to the actuator 30, which either increases laser power to minimize plasma plume generation and/or reduces the speed of movement of the workpiece 16.

It is to be understood that the present invention is not limited to the embodiments described above, but encompasses any and all embodiments within the scope of the following claims.

We claim:

1. A method for controlling laser cutting through surface plasma monitoring, comprising the steps of:
    positioning a Langmuir probe adjacent an impingement point of a laser beam on a workpiece being cut by the laser beam;
    measuring electrical voltage generated in the Langmuir probe by surface plasma generated during the cutting of the workpiece by the laser beam, wherein the measured electrical voltage is measured as a function of time;
    plotting the measured voltage as a function of time to generate a curve and calculating an area under the curve;
    comparing the measured electrical voltage with a desired threshold voltage, wherein the comparison of the measured electrical voltage with the desired threshold voltage includes calculation of a difference between the area calculated under the curve and a desired threshold area; and
    generating control signals to selectively adjust output power of a laser generating the laser beam in response to comparison of the measured electrical voltage and the desired threshold voltage so that surface plasma generation is minimized.

2. The method for controlling laser cutting through surface plasma monitoring as recited in claim 1, further comprising the step of adjusting speed of feeding the workpiece through the laser beam to minimize plasma generation.

3. A method for controlling laser cutting through surface plasma monitoring, comprising the steps of:
    positioning a Langmuir probe adjacent an impingement point of a laser beam on a workpiece being cut by the laser beam;
    measuring electrical voltage generated in the Langmuir probe by surface plasma generated during the cutting of the workpiece by the laser beam, wherein the measured electrical voltage is measured as a function of time;
    plotting the measured voltage as a function of time to generate a curve and calculating an area under the curve;
    comparing the measured electrical voltage with a desired threshold voltage, wherein the comparison of the measured electrical voltage with the desired threshold voltage includes calculation of a difference between the area calculated under the curve and a desired threshold area; and generating control signals to selectively adjust speed of feeding the workpiece through the laser beam in response to comparison of the measured electrical voltage and the desired threshold voltage so that surface plasma generation is minimized.

4. The method for controlling laser cutting through surface plasma monitoring as recited in claim 3, further comprising the step of adjusting output power of the laser generating the laser beam to minimize plasma generation.

5. An apparatus for controlling laser cutting through surface plasma monitoring, comprising:

a Langmuir probe adapted for being selectively positioned adjacent an impingement point of a laser cutting beam onto a workpiece being cut;

means for measuring electrical voltage generated in the Langmuir probe by surface plasma generated during the cutting of the workpiece by the laser beam, wherein the measured electrical voltage is measured as a function of time;

means for plotting the measured voltage as a function of time to generate a curve;

means for calculating an area under the curve;

means for comparing the measured electrical voltage with a desired threshold voltage, said means for comparing the measured electrical voltage comprising means for calculating a difference between the area calculated under the curve and a desired threshold area; and means for generating control signals to selectively adjust power output of the laser in response to comparison of the measured electrical voltage and the desired threshold voltage so that surface plasma generation is minimized.

6. The system for controlling laser cutting through surface plasma monitoring as recited in claim 5, further comprising means for generating control signals to selectively adjust speed of feeding the workpiece through the laser beam to minimize surface plasma generation.

* * * * *